United States Patent
Bauer et al.

(10) Patent No.: US 8,931,385 B2
(45) Date of Patent: Jan. 13, 2015

(54) PORTABLE HOSE CUTOFF SAW WITH BIASING PINS

(75) Inventors: Martin K. Bauer, Littleton, CO (US); Steven G. Austin, Littleton, CO (US)

(73) Assignee: The Gates Corporation, Denver, CO (US)

( * ) Notice: Subject to any disclaimer, the term of this patent is extended or adjusted under 35 U.S.C. 154(b) by 1102 days.

(21) Appl. No.: 11/239,732

(22) Filed: Sep. 29, 2005

(65) Prior Publication Data

US 2007/0068356 A1   Mar. 29, 2007

(51) Int. Cl.
| | |
|---|---|
| *B26D 7/01* | (2006.01) |
| *B23D 45/12* | (2006.01) |
| *B23D 45/04* | (2006.01) |
| *B23D 47/02* | (2006.01) |
| *B23D 47/04* | (2006.01) |

(52) U.S. Cl.
CPC .............. *B23D 45/12* (2013.01); *B23D 45/042* (2013.01); *B23D 47/025* (2013.01); *B23D 47/04* (2013.01)
USPC ............................... 83/451; 83/466.1; 83/581

(58) Field of Classification Search
USPC .......... 83/563, 451, 466.1, 477.2, 469, 471.2, 83/581; 144/329, 286.1, 286.5, 287
See application file for complete search history.

(56) References Cited

U.S. PATENT DOCUMENTS

| | | | |
|---|---|---|---|
| 2,014,017 A | 9/1936 | Leschen | |
| 3,232,159 A | 2/1966 | Stanley | |
| 3,683,557 A | 8/1972 | Maples | |
| 5,884,681 A * | 3/1999 | Nickles | ......................... 144/329 |

FOREIGN PATENT DOCUMENTS

GB            942083         11/1963

OTHER PUBLICATIONS

International Search Report & Written Opinion of the International Search Authority for PCT/US2006/038066 (Related to the above-identified application), Jan. 18, 2004, 9 pages.

* cited by examiner

*Primary Examiner* — Phong Nguyen
(74) *Attorney, Agent, or Firm* — Paul N. Dunlap; Jeffrey A. Thurnau, Esq.

(57) ABSTRACT

The present invention is directed to a portable hose cutoff saw having an improved stable base structure comprising a front plate and a back plate, a top plate extending transversely between the front and back plates interconnecting said front and back plates, and at least one connecting member extending transversely between a bottom portion of the front and back plates. The present invention also provides for a portable hose cutoff saw having a plurality of slideably adjustable hose biasing pins that may be adjusted to optimally bias the hose at or about a portion of a hose to be cut by the saw, thereby resulting in a consistent and straight cut of the hose.

11 Claims, 5 Drawing Sheets

PORTABLE HOSE CUTOFF SAW WITH BIASING PINS

FIELD OF THE INVENTION

The invention relates to a portable saw, and more particularly to a portable hose cutoff saw having a novel base structure for improved stability and portability. The invention also relates to a portable hose cutoff saw having a plurality of slideably adjustable hose biasing pins that may be adjusted to optimally bias the hose at or about a portion of a hose to be cut by the saw, thereby resulting in a consistent and straight cut of the hose.

BACKGROUND OF THE INVENTION

Circular saws for cutting a hose are generally known in the art. Typically, such saws have a base and a main body, including a motor and a circular saw blade, mounted on the base. The saw blade is coupled to and driven by the motor for cutting a piece of hose positioned in the blade's pathway. Due to the substantial weight of the motor and saw blade relative to the weight of the base, most known circular saws must be bolted or otherwise secured to a table or planar surface when in use to maintain the saw in a safe, stable position during a cutting operation. As such, prior art circular saws for cutting a hose are often inefficient and have limited portability.

Further, when cutting a hose, prior art circular saws may have a structure, such as a plurality of pins, mounted on a front of the saw to hold the hose in a position for cutting the hose. However, when the main body, including the saw blade, is lowered relative to the base to cut the hose in such saws, there may be insufficient tension in the hose to provide a straight cut. The user then has to repeat the cut, is left with an undesirable cut piece of hose, or alternatively must use another cutting device to finish the cut. This may result in a substantial loss of materials, time, and other resources, particularly when cutting a bulk quantity of hose pieces.

One of the main sources of the insufficient tension in the hose to be cut in such prior art saws is the lack of adjustability of the pins or other hose supporting structure. Some prior art saws include a plurality of pins, which are fixedly mounted to the front wall of the saw. Accordingly, there is no structure in such saws to adjust the pins so as to increase the bias in the hose to be cut if desired or necessary. Other prior art saws may include a plurality of apertures on the front wall of the saw such that the pins can be unscrewed or otherwise removed from one aperture and inserted and secured in an adjacent aperture to increase the tension on the hose to be cut. However, changing the location of the pins in this way in inefficient and time-consuming, particularly when cutting a large number of different sized pieces of hose, and does not at all allow for much smaller incremental changes in the position of the pins. Further, such pins can often be dislodged by the operation of the saw, such as by vibrations, thereby requiring more time to repeatedly check the connection of the pins, and reconnect the pins to the front wall of the saw if necessary.

Accordingly, there is a need for a more efficient, portable, and adjustable hose cutoff saw that can cut a piece of hose with a more consistent and straight cut.

SUMMARY OF THE INVENTION

In view of the above deficiencies in the prior art, it is an object of the present invention to provide a portable hose cutoff saw having a novel base structure such that the saw is stable without having to bolt or otherwise secure the saw to a planar surface. It is a further object of the present invention to provide a portable hose cutoff saw having a plurality of slideably adjustable hose biasing pins that may be adjusted to optimally bias the hose at or about a portion of a hose to be cut by the saw, thereby resulting in a consistent and straight cut of the hose.

In accordance with one aspect of the present invention, there is provided a portable hose cutoff saw for cutting a hose material which generally comprises a base having a front plate and a back plate, a top plate extending transversely between the front and back plates to interconnect the front and back plates, and at least one connecting member, and preferably two spaced-apart connecting members, extending transversely between a bottom portion of the front and back plates. A main body comprising a saw blade and a handle is typically pivotally mounted on a top portion of the top plate of the base. The main body may include a motor for driving the saw blade. Typically, the front plate also includes a cutting recess for receiving a portion of the saw blade when the main body is lowered with respect to the base to cut a piece of hose biased in front of the front plate. In one embodiment, the front plate and top plate each include a recess that forms an overlapping cutting recess to receive a portion of the saw blade when the blade is lowered with respect to the base.

The front and back plates may be any suitable shape, including a polygonal shape, and typically have a flat bottom edge. In one embodiment, the front and back plates have a generally hexagonal shape with a flat bottom edge. Preferably, the top plate extends longitudinally across half a length of the front and back plates to provide the base with added stability, and more preferably at least about 60% of the length of the front and back plates. In one embodiment, the front plate also includes a vertical extent which extends above a plane of the top plate, and which includes a portion of the cutting recess of the front plate.

In another aspect of the present invention, there is provided portable hose cutoff saw having a plurality of slideably adjustable hose biasing pins that may be adjusted to optimally bias the hose at or about a portion of a hose to be cut by the saw, thereby resulting in a consistent and straight cut of the hose. The saw comprises a base including a front plate, and a main body having a saw blade and a handle, the main body pivotally mounted on the base, and a plurality of slideably adjustable pins mounted on a front face of the front plate around and/or under which the hose is snaked.

The plurality of slideably adjustable biasing pins on the front face typically comprises at least one pair of first biasing pins, and preferably one pair of first biasing pins, and at least one pair of second biasing pins, and preferably one pair of second biasing pins, mounted by any suitable structure known in the art on the front face of the front plate. At least one pair of the first biasing pins is spaced a distance $d1$ from a vertical centerline plane of the front plate and at least one pair of second biasing pins is spaced a distance $d2$ from a vertical centerline plane of the front plate such that $d2>d1$. The vertical centerline plane extends vertically through a horizontal centerpoint of the front plate.

In addition, in one embodiment, an imaginary horizontal line drawn through at least one pair of first biasing pins is disposed on a plane above an imaginary horizontal line drawn through at least one pair of second biasing pins. When the front plate includes a cutting recess, each pair of first and second biasing pins typically has one member of the pair on a respective side of the cutting recess.

Preferably, the pins are mounted on the front face of the front plate such that each of the pins is slidable and/or movable in at least one of a horizontal or vertical direction, i.e. up, down, left and/or right, or therebetween, to optimally bias the hose at or about the location of the hose to be cut without the need to remove and reconnect any of the biasing pins. The pins may be mounted such that they may be selectively engaged, disengaged, and slideably adjusted on the front face of the front plate without the need to remove the pin from the front face. For example, the pins may include a spring, slot, and/or screw structure, or any other suitable structure known in the art that allows the pin to be adjusted in a horizontal or vertical direction, or therebetween, by a desired increment without removing the pin from the front face. Once the hose is coiled around and/or under the first and second biasing pins, the saw blade can be lowered with respect to the base to efficiently and evenly cut the hose in front of the cutting recess, and typically between a pair of the first biasing pins. The saw can be manual or preferably power generated with battery or AC power.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
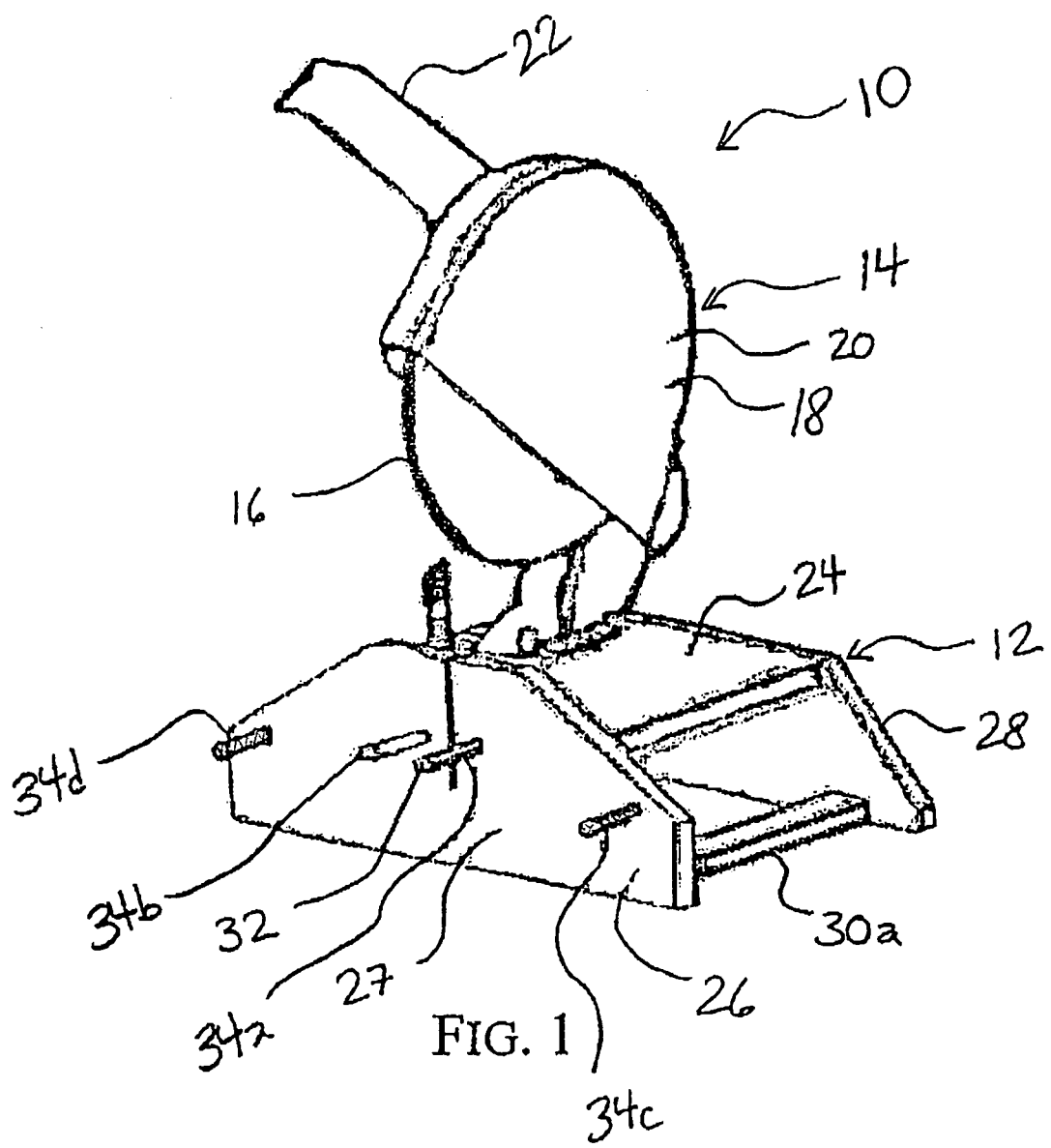
FIG. 1 is a perspective view of a portable saw in accordance with the present invention.

Now referring to the figures, as shown in FIG. 1, the circular saw 10 includes a base 12 and a saw body 14 mounted on the base. Saw body 14 includes a circular or disc-shaped blade 16 disposed generally on one side of saw body 14 and a housing 18. In one embodiment, housing 18 encases a motor (not shown), which drives the blade 16. Any suitable power source known in the art may be utilized to power the motor, such as, for example, such as a battery or AC power source. Typically, saw 10 includes a power cord (not shown) for delivering power to the motor. Saw body 14 preferably includes an upper blade guard 20 for preventing injury and for covering the upper portion of blade 16, and a handle 22 extending outward from saw body 14. The user may lower main body 14 and saw blade 16 by grasping handle 22 and pushing the handle downward with respect to base 12 to cut hose as will be discussed in detail below.

By the term "hose" as used herein, it is meant any hose, flexible pipe, tubing, rope, or elongated cord material, whether having a bore or not. The types of hose that may be cut by saw 10 of the present invention, include but are not limited to, any polymeric hose, such as, for example, vinyl, Teflon®, Tygon®, PEEK®, and/or rubber hose, stainless steel tubing, or any other tubing or hose material. The hose cut by the saws of the present invention typically ranges from about ¼ to about 1 inch in diameter, but the saws of the present invention may cut smaller or larger diameter hose. It is contemplated that when cutting larger or smaller diameter hose, the location and/or number of pins may require repositioning as will be discussed below.

Figure 2:
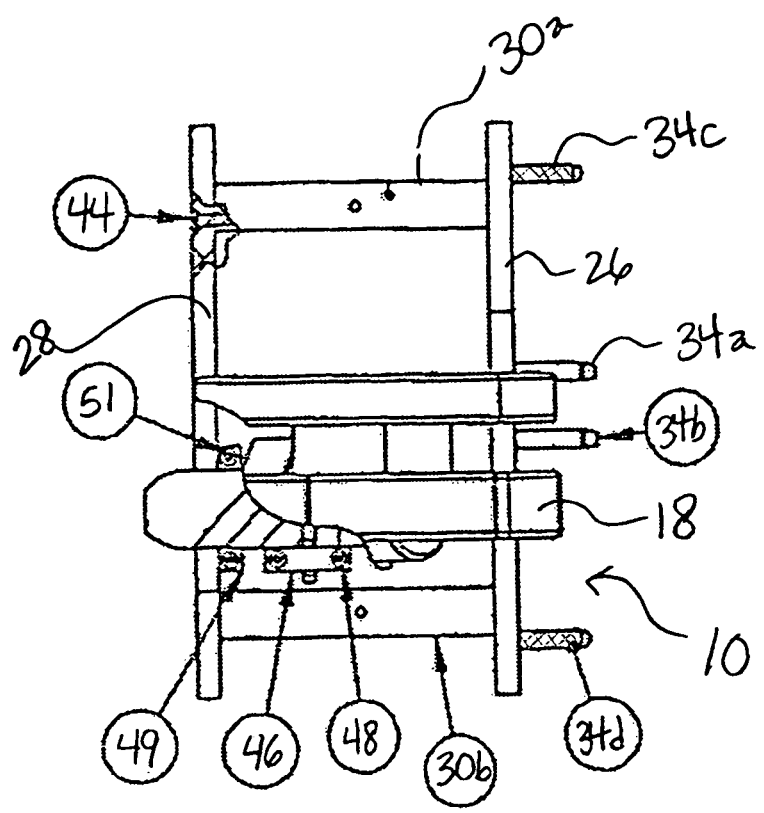
FIG. 2 is a top plan view of the portable saw of FIG. 1.

Base 12 typically includes a top plate 24, a front plate 26 having a front face 27, a rear plate 28, and at least one connecting member, and preferably two connecting members 30*a-b* (as shown in FIG. 2) to provide the saw 10 with a desired stability. Each of connecting members 30*a-b* and top plate 24 typically extend transversely between the entire width between front plate 26 and rear plate 28. Additionally, as shown in FIG. 1, top plate 24 typically extends longitudinally along at least half a length of the front plate 26 and rear plate 28, and preferably extends at least about 60% of the length of front plate 26. In one embodiment, the front plate 26 has a cutting recess 32. When the saw blade 16 is lowered with respect to base 12 to cut the hose (not shown), cutting recess 32 receives a portion of saw blade 16 within cutting recess 32. Top plate 24 may also include a recess that overlaps with a portion of cutting recess 32.

It is contemplated that the components of base 12 may be formed from any relatively rigid material to enable base 12 to provide a stable support, particularly for the weight of the motor and housing of saw body 14. For example, in particular embodiments, top plate 24, front plate 26, rear plate 28, and connecting members 30*a-b* are each formed from ½ inch stainless steel. The components of the base, top plate 24, front plate 26, rear plate 28, and connecting members 30*a-b*, may be interconnected by any suitable structure, such as by screws, rivets, and the like.

The structure of the base of the saw in the present invention enables the saw to be fully transportable from one location to another as needed. As such, the present invention provides a fully portable, stable, and safe saw, which is not required to be bolted or otherwise secured to a table or planar surface when in use to maintain the saw in a safe, stable position when cutting. If desired, however, the saw may be releasably secured to a planar surface as desired by clamps, vices, or the like. It is contemplated that the shape of the front plate and back plate may be any geometric shape, including but not limited to a polygonal shape, such as a hexagonal shape having a flat bottom edge. The strength and stability of the base is at least due in part to the structure of the front plate and back plate, and the interconnecting of the front plate and back plate at a top portion and bottom portion of each plate by a top plate and at least one connecting member respectively. Preferably, the front and back plates are of such a shape that the base has no sharp edges that may cause injury, or damage or snagging of the hose to be cut.

In another aspect of the present invention, saw 10 includes a plurality of slideably adjustable hose biasing pins that bias the portion of the hose to be cut, thereby resulting in a consistent and straight cut of the hose. The location of the cut is generally at a point in front of the recess 32 in the path of saw blade 16. To bias the hose and place the desired tension in the hose at or about the location to be cut, a front face 32 of front plate 24 typically includes a pair of first biasing pins 34*a-b* and at least one pair of second biasing pins 34*c-d*. In the illustrated embodiments, as shown in FIG. 1, for example, there is one pair of first biasing pins 34*a-b* and one pair of second biasing pins 34*c-d*. It is contemplated, however, that any number of pairs of biasing pins may be utilized in the present invention.

Figure 4:
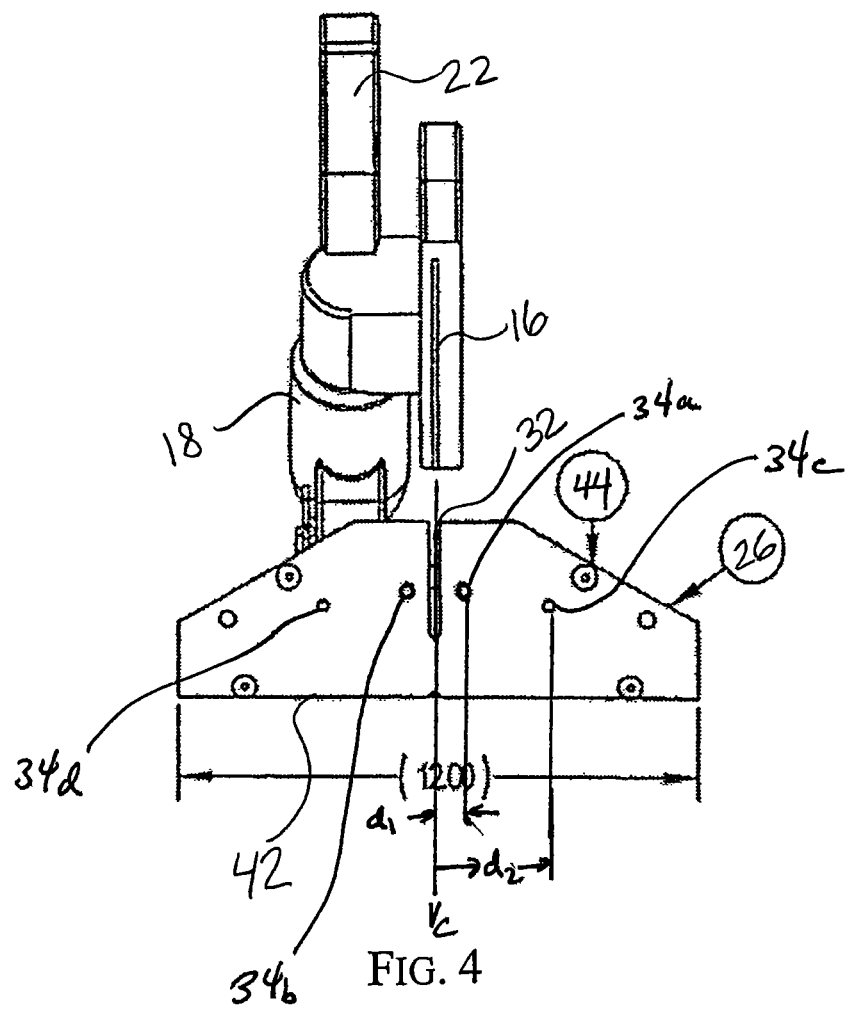
FIG. 4 is a front elevation view of the portable saw of FIG. 1.

As shown in FIG. 4, first biasing pins 34*a-b* are spaced a distance d1 from a vertical centerline plane ($V_c$) of front plate 26 and second biasing pins 34*c-d* are spaced a distance d2 from vertical centerline plane ($V_c$) of front plate 24 such that d2>d1. The vertical centerline plane is an imaginary plane extending vertically through a horizontal center of front plate 26. Preferably, when front face has a total length of about 12 inches, first biasing pins 34*a-b* are spaced apart from about 0.25 to 1.5 inches from the vertical centerline plane, and more preferably about 1.125 inches, and second biasing pins 34c-d are preferably spaced at least about 1.5 inches, and more preferably from about 2.5 to about 5.0 inches from the vertical centerline plane ($V_c$). The spacing between the first biasing pins 34a-b is preferably in the range of from about 0.5 to about 3 inches. The spacing between the second biasing pins 34c-d is preferably in the range of from about 3 to 10 inches. Moreover, the ratio of the distance between a pair of first biasing pins 34a-b and the distance between a pair of second biasing pins 34c-d is preferably in the range of from about 2.5:1 to 5:1. As appreciated by one skilled in the art, the dimensions provided herein are merely various embodiments of the present invention, and are not critical to the invention itself. Depending on the size of saw, hose and specific application, the dimension and spacing of the biasing pins may be modified.

When the hose is snaked around and/or under slideably adjustable pins 34a-d, a predetermined and/or desired tension or bias is provided at or around the area of the hose that is to be presently cut by the saw blade 16, for example, a point in front of recess 32 and between first biasing pins 34a-b. Any one of first biasing pins 34a-b may have a different exterior surface from any one of second biasing pins 34c-d. For example, in one embodiment, each of pins 34a-d may have a relatively smooth surface or a knurled surface. In one embodiment, first biasing pins 34a-b have a relatively smooth surface and second biasing pins 34c-d have a knurled surface. The knurled surface may aid in maintaining the hose in a relatively straight line as the hose is cut.

Figure 5:
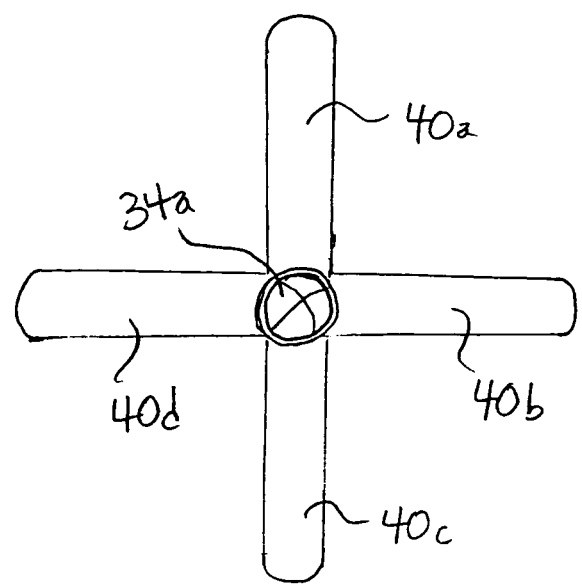
FIG. 5 is a front view of an adjustable biasing pin mounted on the front plate in accordance with the present invention.

As shown in FIG. 5, any one of biasing pins 34a-d, and preferably each of biasing pins 34a-d, may be slideable and/or movable in one of a horizontal or vertical direction, i.e. an up, down, left, and/or right direction, or therebetween. In this way, the biasing pins 34a-d can be adjusted such that the amount of tension on the hose can be increased or decreased as desired at or about the location of the hose to be cut. For example, if the tension on the hose snaked around and/or under pins 34a-d is desired to be increased, second biasing pins 34c-d could each be lowered resulting in greater tension on the portion of the hose supported on top of first biasing pins 34a-b. Biasing pins may be mounted on front face 27 of front plate 26 by any suitable structure that enables slidable or adjustable movement of the pins 34a-d in one of a horizontal or vertical direction, or therebetween.

Preferably, biasing pins 34a-d are mounted on front face 27 such that the pins are slideable and/or selectively adjustable in a horizontal or vertical direction, or therebetween, without the need to unscrew and otherwise remove or detach the pin from the front face and thereafter reconnect the pin. The user is thus not required to unscrew a male-threaded pin from a female threaded aperture and thereafter rescrew the pin into an adjacent aperture to change a position of the pin, for example. Instead, the present invention provides selectively slideable biasing pins that may be slideably engaged and disengaged without the need to fully remove the pin from the front plate. As shown in FIG. 5, front face 27 of front plate 26 may include a plurality of slot recesses or channels 40a-d into which the pins may be inserted and repositioned up, down, left, or right. Any suitable structure that enables slideable movement of the biasing pin up, down, left, and/or right, and which can maintain the biasing pin in its adjusted horizontal or vertical position may be utilized, such as a pin having a spring therein, for releasably engaging a portion of the front face to maintain the pin in an adjusted position.

For example, as shown in FIG. 5 any one of the pins can slidably move up, down, left, or right in channels 40a-d, such as channel 40a, and then can be tightened and loosened as needed. In one embodiment, pin 34a may contain a threaded male portion and a threaded female portion, which receives the threaded male portion. Preferably, the threaded female portion is located on a rear side of front plate 26 and on one side of channels 40a-d while the threaded male portion is located on an opposite side of front plate 26 and channels 40a-d. To adjust the position of pin 34a, the male portion can be loosened and tightened as necessary in the female portion. In the loosened position, the pin is incrementally slideable to a new desired position. If such repositioning of the pins is not desired, any one of the pins may be threaded and screwed into a mating aperture in front face 27 of front plate 26, or otherwise removably or fixedly secured to front face 27 by any other suitable connection.

Figure 3:
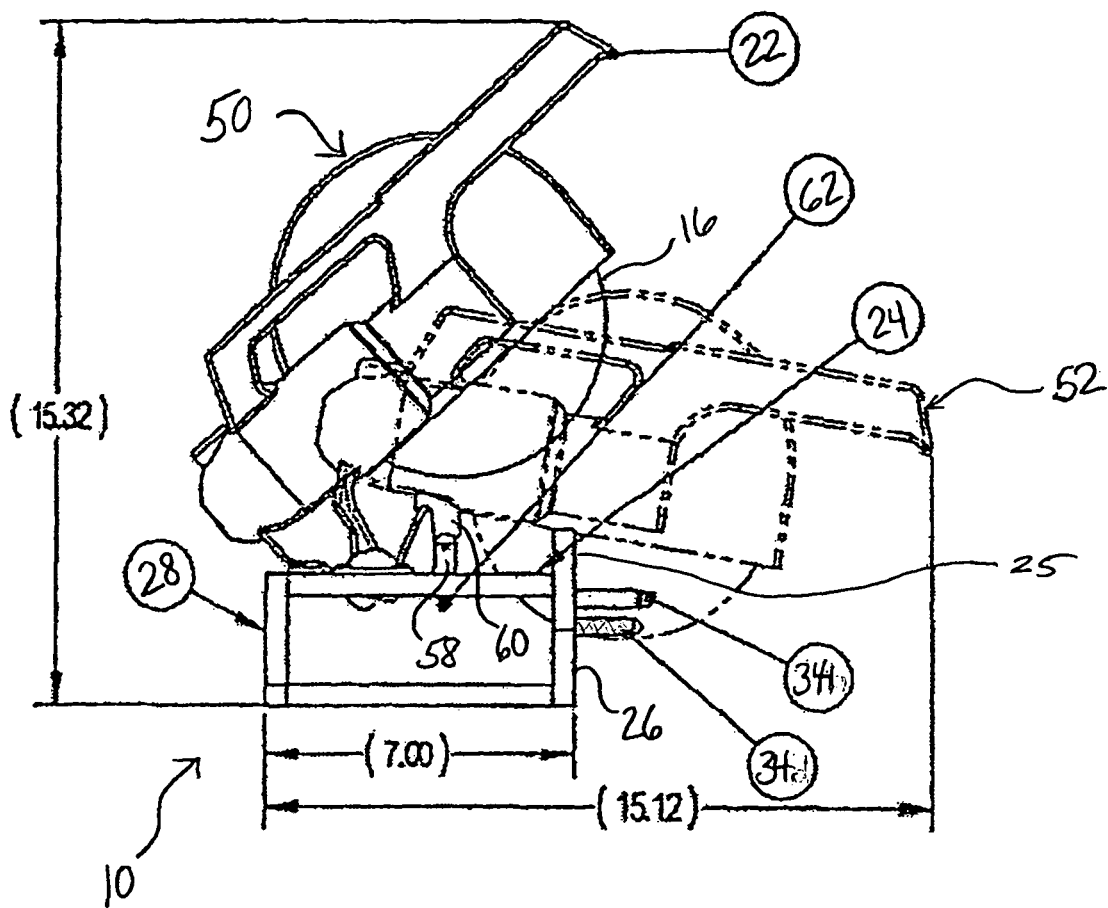
FIG. 3 is a side elevation of the portable saw of FIG. 1.

In one embodiment, as shown in FIG. 3, front plate 26 also includes a vertical extent 25 that extends above a plane of top plate 24. Preferably, the vertical extent 25 extends above a top portion of top plate by at least about 0.5 inches, and more preferably by at least about 1 inch. Extent 25 facilitates the positioning of adjustable pins 34a-d toward an upper portion of front plate 26 such that the saw blade 16 can cut all the way through the hose when saw body 14 is lowered to between about an 80 degree to about a 90 degree angle relative to base 12. In addition, it is contemplated by the present invention that first biasing pins 34a-b and second biasing pins 34c-d are disposed on the front face of front plate such that biasing pins 34a-d and hose that is snaked therethrough, substantially follows the contour of the base.

In one embodiment, as shown in the FIG. 4, front plate 26 is of a hexagonal shape and has a substantially flat bottom edge 42. In this embodiment, an imaginary horizontal line drawn through at least one pair of first biasing pins 34a-b is disposed on a plane above an imaginary horizontal line drawn through at least one pair of second biasing pins 34c-d. Preferably, the imaginary horizontal line drawn through at least one pair of first biasing pins 34a-b is disposed at least about 0.1 inches, and preferably from about 0.2 inches to about 2.0 inches, above the imaginary horizontal line drawn through at least one pair of second biasing pins 34c-d. As a result, hose to be cut is raised relative to the remainder of the hose at the location of the cut (in front of recess 32 and between first biasing pins 30a-b) and a desired tension or bias is placed on the hose at or about the location of the cut. Alternatively, front plate 26 and rear plate 28, and the position of biasing pins 34a-d may be any suitable arrangement that places a desired bias in the hose at or about the location to be cut, thereby resulting in a straight cut of the hose.

FIG. 2 illustrates a top plan view of the saw 10 of FIG. 1 in accordance with the present invention. As shown in FIG. 2, front plate 26 and rear plate 28 are interconnected by connecting members 30a-b. Each of the connecting members 30a-b may include an aperture for removably or fixedly securing the saw to a planar surface, such as a workbench, by a suitable screw or other securing member. Further, each of top plate 24 and connecting members 30a-b may be secured to a rear portion of front plate 26 and a rear portion of rear plate 28 by any suitable securing member, such as a 1" screw 44, or any other suitable structure.

Saw body 14 may be similarly secured to a top portion of top plate 24 by any suitable structure. In one embodiment, as shown in FIG. 2, a bottom portion of saw body 14 may be secured to top plate 24 with a bracket 46 and mating screws 48 which fit through mating apertures in bracket 46 and top plate 24. Top plate 24 may include a relatively large aperture (not shown) that may receive a lower portion of saw body 14 when the saw body 14 is lowered from its starting position 50 to its cutting position 52 (as shown by the broken lines in FIG. 3). Optionally, saw 10 also includes a second bracket 49 which is secured to top plate 24 behind bracket 46 by screws 51 and across a rear portion of the large recess for added stability of top plate 24.

As is also shown in FIG. 2, a bottom portion of housing 18 of saw body 14 may include an axle 54 that extends through the bottom portion of housing 18. Axle 54 is positioned below bracket 46 and transverse to the relatively large aperture of top plate 24. As shown in FIG. 3, axle 54 enables a bottom portion 56 of housing 18 of saw body 14 to extend through the large aperture of top plate 50 in its starting position 50 and enables the bottom portion of housing 18 to rotate through the large aperture from saw body 14 is moved from its starting position 50 to its cutting position 52 and vice-versa.

Top plate 24 may also include a pair of relatively small recesses transverse to the large aperture to receive axle 54 underneath bracket 46. Axle 54 may include a spring (not shown) so as to enable the saw to spring back from its cutting position 52 as shown in FIG. 3 to its starting position 50 by simply releasing pressure on the saw handle.

When saw body 14 including blade 16 is lowered with respect to base 12, it is desirable to include a stop 58 to prevent saw body 14 blade 16 from being lowered more than is necessary to cut the hose placed in front of cutting recess 32. Stop 58 may be of any suitable shape and is typically mounted to one of bracket 46 and/or a top portion of top plate 24 by a screw 62, as shown in FIG. 3, or by any other suitable connecting structure. A bottom portion of housing 18 may include an extent 60 extending outward from housing 18 to abut stop 58 when saw body 14 is lowered to its cutting position 52.

In operation, a length from a roll or a single piece of hose desired to be cut (not shown) may be first located over second biasing pin 34c, located over first biasing pins 34a-b, and thereafter located under second biasing pin 34d to place a bias in the hose at least between pins 34a-b. If necessary, biasing pins 34a-d may be slideably adjusted up, down, left, or right as discussed previously. Alternately the biasing pins 34a-d may be slideably adjusted at a specific angle. As shown in FIG. 3, when a cut of the hose is desired, the user may power the motor of saw 10 (if saw 10 is power generated), and using handle 22 lower the saw body 14, including saw blade 16, from its starting position 50 to its cutting position 52 until saw body 14 cannot be lowered further due to stop 58. After the straight and even cut has been made in the biased portion of the hose held between first biasing pins 34a-b, the user may gently allow saw body 14 to spring back from its cutting position 52 to its starting position 50, as shown in FIG. 3. Any other piece of hose may thereafter be cut as desired.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

What is claimed is:

1. A portable saw comprising:
    a base comprising a front plate;
    a saw body comprising a saw blade and a handle, said saw body pivotally mounted on said base for movement of said saw blade downward; and
    a plurality of adjustable biasing pins mounted on a front face of said front plate, wherein each of said plurality of adjustable biasing pins is slideably movable in a horizontal direction and a vertical direction;
    wherein said plurality of adjustable biasing pins comprises at least one pair of first biasing pins and at least one pair of second biasing pins on the front face to retain a hose disposed therebetween generally perpendicular to said saw blade as said saw blade moves downward, and wherein at least one pair of said first biasing pins is spaced apart from a vertical centerline plane of the front face by a distance d1, wherein at least one pair of said second biasing pins is spaced from the vertical centerline plane by a distance d2, and wherein d2>d1.

2. The portable saw of claim 1, wherein said plurality of adjustable pins comprises one pair of first biasing pins and one pair of said second biasing pins, and wherein the ratio of the distance between at least one pair of said second biasing pins and the distance between at least one pair of said pair of first biasing pins is from about 2.5:1 to about 5:1.

3. The portable saw of claim 1, wherein at least one of said first biasing pins has an exterior surface distinct from at least one of said second biasing pins.

4. The portable saw of claim 1, wherein an imaginary horizontal line drawn through at least one pair of said first biasing pins is disposed on a plane above an imaginary horizontal line drawn through at least one pair of said second biasing pins.

5. The portable saw of claim 1, wherein at least one pair of said first biasing pins is spaced apart from about 0.25 to 1.5 inches from the vertical centerline plane and at least one pair of said second biasing pins is spaced at least about 1.5 inches from the vertical centerline plane.

6. The portable saw of claim 1, wherein said base further comprises:
    a back plate;
    a top plate extending transversely between said front and back plates interconnecting said front and back plates; and
    at least one connecting member extending transversely between a bottom portion of said front and back plates.

7. The portable saw of claim 6, wherein said at least one connecting members comprise two spaced apart connecting members extending between a bottom portion of said front and back plates.

8. The portable saw of claim 6, wherein said top plate extends longitudinally across at least half a length of said front and back plates.

9. The portable saw of claim 6, wherein at least one of said front and back plates is of a polygonal shape.

10. The portable saw of claim 1, further comprising a motor interconnected to the saw blade for driving the saw blade.

11. The portable saw of claim 1, wherein at least one said first biasing pins and said second biasing pins are selectively movable in at least one of a horizontal or vertical direction, or therebetween.

* * * * *